United States Patent

Humphrey

[15] 3,651,889

[45] Mar. 28, 1972

[54] LIQUID SUPPLY APPARATUS FOR AIR LINES

[72] Inventor: John J. Humphrey, Denver, Colo.
[73] Assignee: C. A. Norgren Co., Littleton, Colo.
[22] Filed: Feb. 16, 1970
[21] Appl. No.: 11,534

[52] U.S. Cl. ..........................184/55 A, 137/400, 184/103 A
[51] Int. Cl. .......................................................F16n 29/02
[58] Field of Search ..........................184/55 A, 103 A, 6, 6.4; 137/400, 411, 430, 433

[56] References Cited

UNITED STATES PATENTS

| | | | |
|---|---|---|---|
| 2,219,473 | 10/1940 | Delancey | 137/400 |
| 2,903,091 | 9/1959 | Goehring | 184/103 A |
| 3,338,262 | 8/1967 | Chopelin | 137/411 |
| 3,447,562 | 6/1969 | Hoffman | 184/6 X |

*Primary Examiner*—Manuel A. Antonakas
*Attorney*—Sheridan, Ross & Burton

[57] ABSTRACT

Liquid supply apparatus for air lines and the like, of the type employing float controlled reservoirs, each of which is maintained at a substantially constant level, and supplied from a central source, such as oil under pressure, characterized by a pair of bowl filling valves which operate in backup relationship such that a first valve normally closes flow to the bowl, while a second downstream valve remains open, but in the event the first valve fails to close as normally intended, the second valve becomes operative and closes, thereby preventing overfilling the bowl.

It has particular utility with a throwaway or non-repairable unit which may be economically manufactured and which is also tamper-proof. These features involve a construction in which certain parts are secured together by non-removable interference fits, in lieu of removable threaded fastenings and the like formerly employed. In lieu of a dynamic seal subject to wear, such as an O-ring, a static seal is provided having portions which are flexibly distortable.

10 Claims, 2 Drawing Figures

INVENTOR
JOHN J. HUMPHREY
BY
Sheridan, Ross & Burton
ATTORNEYS

LIQUID SUPPLY APPARATUS FOR AIR LINES

BACKGROUND OF THE INVENTION

In the operation of air actuated devices, such as tools and the like, it has long been conventional practice to provide a lubricator in the air line which atomizes oil for delivery to the air stream which operates the device for the purpose of lubricating its operative parts. In one form of such apparatus, and to which the present invention is closely related, a central oil supply under pressure delivers oil to a plurality of lubricators, each disposed near an air device to be operated, to thus minimize the length of the air conduit between the lubricator and air operated device and obviate separation of the atomized oil from the air stream. The U.S. Pat. to Hoffman No. 3,447,562 is exemplary of such type of system, disclosing a source of air pressure, a central supply of oil under pressure, and a plurality of lubricators for adding oil mist or fog to air delivered to the individual air actuated devices which they service. Each lubricator comprises, briefly, an oil reservoir in the form of a bowl which contains a float for maintaining the oil level substantially constant, a dip tube communicating with the oil in the bowl, a venturi nozzle for providing the air stream with oil mist, and a pressure regulator. The pressure regulator is provided with an inlet valve communicating with the central oil supply which closes in response to an increase in pressure on one side of a diaphragm, the other side of which communicates with bowl pressure. During filling of the bowl, the float maintains a bowl filling valve off of its seat and when the desired bowl level has been attained, the float rises and permits the bowl filling valve to close.

If a precise upper level in the bowl is to be attained it will now be apparent that the bowl filling valve (92 of Hoffman) must invariably seat and shut off flow to the bowl and, should it fail to properly seat, oil would continue to flow to the bowl and eventually flood same destroying the desired metering of oil through the dip tube and the venturi, thus delivering an excess quantity of oil to the air actuated device which it services.

Should the malfunction just referred to occur in some forms of the prior art referred to (such as FIG. 4 of the Hoffman patent) it may be corrected, upon discovery of same, by disassembly, cleaning of the unit, and ensuring that the bowl filling valve properly seats. It has become desirable, however, to provide a lubricator unit which cannot be dismantled after manufacture and is thus discardable when it has served a useful life (such as Fig. 3 of the Hoffman patent). This not only effects economies of manufacture by reason of eliminating certain machining operations and simplification of parts, but also precludes tampering with its internal parts by personnel not fully qualified to repair same or lack the necessary testing or other equipment to effect a proper repair. As will be apparent from the non-dismantable construction of the Fig. 3 construction of the Hoffman patent, the useful life of same could be shortened if ball 92 should fail to close or if the O-ring seal should wear and leak, permitting oil to bypass the control chamber and flow directly into the bowl. While the invention has particular utility in the non-repairable environment just referred to, it may, of course, be employed in a unit subject to disassembly and repair.

SUMMARY OF THE INVENTION

Liquid supply apparatus for air lines or the like, of generally conventional construction which employs a float controlled bowl reservoir and a pressure regulator, characterized by a first-valve which normally closes flow to the bowl, but in the event it fails to close, a second normally open backup valve becomes operative and closes the flow, thereby preventing possible overfilling of the bowl. Certain parts of the regulator are secured together in a manner to prevent disassembly, and a static seal is employed which is not subject to the wear of a former dynamic seal, such as an O-ring.

In accordance with the foregoing, one of the objects of the invention is to provide a lubricator with a backup valve system which prevents overfilling of a lubricator bowl in the event of malfunction of its normally operative valve.

Another object, consonant with the foregoing, is to provide a lubricator which is not subject to disassembly for repair, cleaning, or replacement of parts, and in which the backup valve is, accordingly, an important feature to prolong its useful life.

Another object is to eliminate a pressure regulator dynamic seal, subject to wear and leakage, and substitute a static seal for same which is not subject to wear and leakage which could bypass oil directly to the bowl.

A further object is to provide a pressure regulator of simplified construction which may be economically manufactured.

Still further objects, advantages, and salient features will become more apparent from the detailed description to follow, the appended claims, and the accompanying drawing to now be briefly described.

DESCRIPTION OF PREFERRED EMBODIMENT

Figures 1, 2:
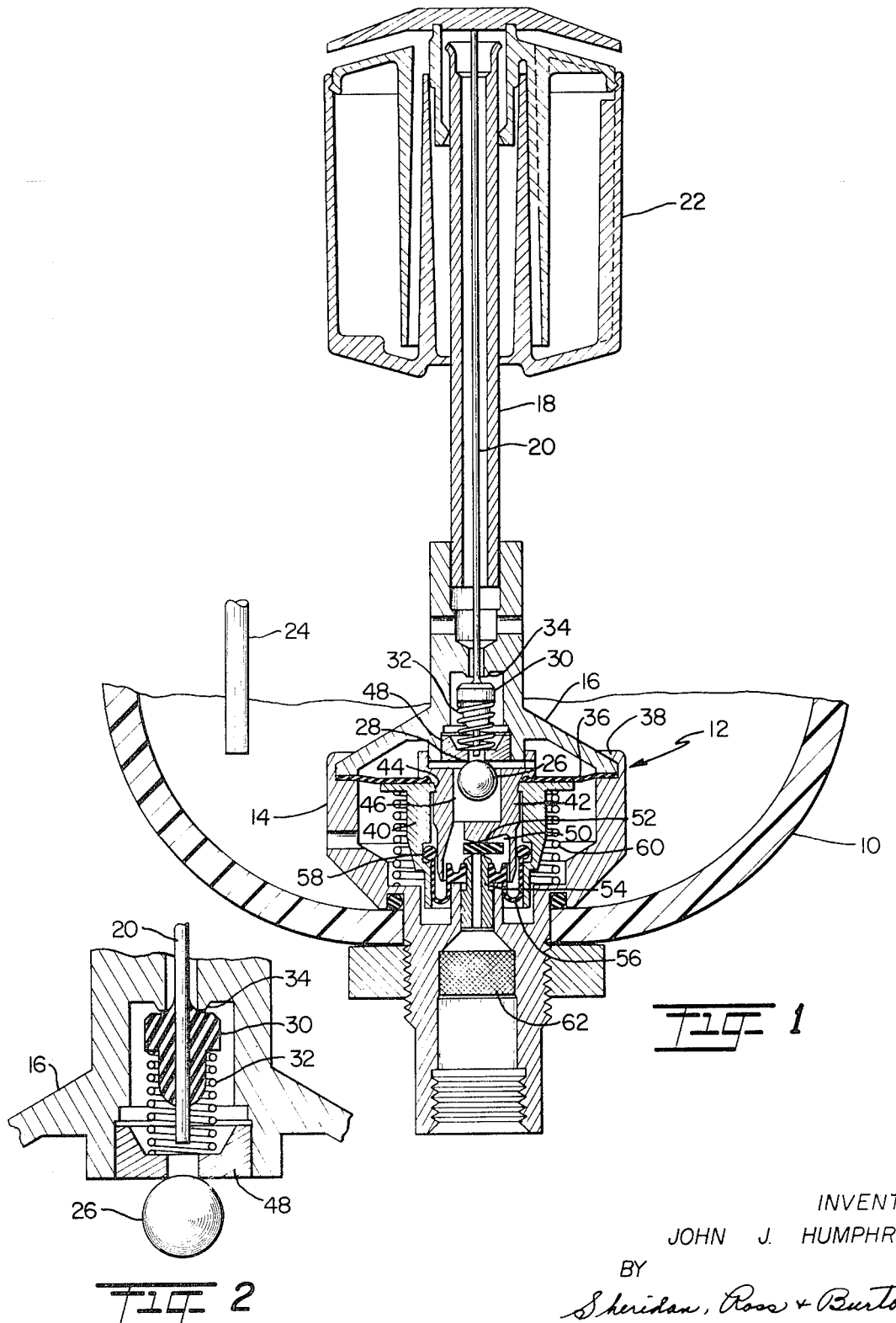
FIG. 1 is a central vertical section through the subject of the invention.
FIG. 2 is a detail illustrating abnormal or backup action of the valve system.

Referring now in detail to the drawing, and first to FIG. 1, the subject of the invention comprises, in general, a bowl 10, to the bottom of which is affixed a metallic pressure regulator body 12, formed of a lower portion 14 and an upper portion 16. A mast 18 is affixed to upper portion 16 which contains an axially movable rod or valve actuator 20 which moves downwardly, on occasion, when float 22 falls in response to lowering of the liquid level in the bowl. As so far described, the construction is essentially the same as in the Hoffman patent (particularly Fig. 2 of same) and, as will be understood, a dip tube 24 extends upwardly and drips oil into a venturi nozzle contained in the air flow passage, as fully disclosed in the Hoffman patent. Ball valve 26 is also conventional and normally seats on seat 28 when float 22 rises to a predetermined position and stem 20 moves upwardly and permits ball 26 to engage seat 28. Certain differences from the Hoffman patent will now be described.

A backup valve 30 is moulded on stem 20 which is urged upwardly by a light spring 32 but normally does not engage seat 34 so long as ball valve 26 sealingly engages its seat. This is illustrated in FIG. 1 wherein ball valve 26 has properly seated, the level in the bowl is at its normal high level and rod 20 prevents backup valve 30 from engaging its seat. Referring now to FIGS. 2, it will be assumed that ball valve 26 has engaged its seat but leaks. This could occur either by nonuniform wear of the ball or seat or by reason of a small particle of foreign matter being on the seat when the ball engages same. In this event, fluid will continue to flow to the bowl, raising the float level above normal. As the float rises to some abnormal level, a level will be reached at which the float is no longer in engagement with the upper end of rod 20 which permits the backup valve to engage its seat, thus stopping flow to the bowl. If leakage has been due to foreign matter, such matter may, upon continued operation, be purged or flushed away from its position, thus permitting the ball valve to resume its normal function. As illustrated, valve 26 is conventional hardened sphere, conventionally employed in ball bearings, and backup valve 30 is of soft material, such as synthetic rubber, or other elastomer which may shut off flow even with a minute particle attached to same. It is to be understood, however, that the material employed for the valves is not germain to the broader aspects of the invention and either or both may be elastomeric material or hard valves, such as balls or the like.

Referring again to FIG. 1, the peripheral edge of diaphragm 36 is disposed between lower and upper portions 14, 16 of the regulator by a peripheral fold or crimp 38 on lower member 14 which distorts the material and prevents disassembly of portions 14, 16, this feature being conventional in the Hoffman patent (FIG. 3 of same). Certain parts of the regulator differ structurally, however, which differences will now be described.

Diaphragm 36 is clamped between an outer member 40 and an inner member 42, these preferably being of moulded plastic material. An annular inwardly directed ridge or flange 44 is formed on outer member 40 which is generally sawtoothed in cross section so that when the two members are press-fitted together the flange distorts the inner member, forming a mating annular groove in same, which positively locks the parts against retrograde movement, that is, they are locked against disassembly. The central portion of inner member 42 is provided with an aperture 46, forming a cage containing ball 26, which seats on seat 28 in valve seat insert 48 which is press-fitted into upper body portion 16. Another cavity 50 is formed in inner member 42 which contains a generally triangular shaped plate valve 52 which seats on the upper end of a tubular valve seat insert 54 which is press-fitted into lower body portion 14. A seal member 56, provided with a central aperture, surrounds and sealingly engages insert 54, its peripheral edge being O-ring shaped which is partly disposed in an annular groove 58 in outer member 40, its inner periphery sealingly engaging inner member 42. As will be apparent, there is no sliding movement of the seal where it engages members 40, 42 and valve insert 54, and hence no wear can occur thereat. The inner and outer portions of the seal are joined by an annular portion which is U-shaped in cross section. As inner and outer portions 40, 42 bodily move, carrying the peripheral portion of the seal with same, the U-shaped portion distorts and functions similar to a sealing boot or bellows having ends affixed to relatively movable members. A spring 60 of conventional construction and function urges the diaphragm in an upward direction, aiding bowl pressure which communicates with the lower surface of the diaphragm. The operation of the pressure regulator is the same as in the Hoffman patent in that when the pressure above the diaphragm is several pounds above bowl pressure, valve 52 closes. This ensures that when ball valve 26 opens there is no sudden pressure surge of oil entering the bowl.

As will be apparent from FIG. 1, the only threaded connections employed are an external thread on member 14 which carries a nut for securing the bowl to same and an internal thread for connection to a pipe fitting. A cup-shaped screen 62 is also provided in member 14 which is accessible for removal, cleaning, or replacement.

What is claimed is:

1. In a system of the type for adding liquid to pressurized flowing gas, such as oil to air, and having a central source of the liquid at a pressure in excess of the gas for supplying liquid to at least one remote service device having a bowl, the bowl containing a float for maintaining a substantially constant level of the liquid therein and further containing an actuator having a lower end and being moveable by the float, the device also containing a liquid inlet valve and a pressure regulator, to which the inlet valve is connected, for closing the inlet valve when pressure in the pressure regulator exceeds bowl pressure by a relatively small value and irrespective of the excess pressure of the source, the device further having a first outlet valve from the regulator unaffixed to the actuator, said first outlet valve being closable by regulator pressure and openable by engagement with the end of the actuator upon falling of the float for delivering liquid from a regulator to the bowl, the improvements, comprising:
   a second float controlled outlet valve connected to the actuator at a point spaced from the lower end thereof and downstream from the first outlet valve and completely detached from the first outlet valve to remain open so long as the first outlet valve closes without leakage therepast when the float rises to a normal predetermined level and closable when leakage occurs past the first outlet valve and the float rises to a predetermined level above said normal level whereat the end of the actuator is spaced from said first outlet valve whereupon all forces acting upon said second valve tend to move it to a closed position.

2. A device in accordance with claim 1 wherein said second outlet valve is of elastomeric material of sufficient resilliency to close without leakage despite the presence of small foreign matter disposed between it and a valve seat with which it is engageable.

3. A device in accordance with claim 1 wherein said regulator comprises a circular diaphragm and a pair of telescopic outer and inner members press-fitted together with the diaphragm disposed therebetween, the pair of members being locked during the press-fitting by deforming means preventing their separation, and a spring engaging the outer member for urging the diaphragm in a direction to open the inlet valve.

4. A device in accordance with claim 3 wherein said pair of members are moulded plastic material and said deforming means comprises an annular flange on one of the members adapted to deform a mating groove into the other member, when the members are press-fitted together, for preventing said separation.

5. A device in accordance with claim 3 including an inlet valve seat having a circular outer surface, an elastomeric seal device having a central aperture surrounding said outer surface in static sealing engagement therewith, the seal device having a peripheral O-ring in static sealing engagement between said outer and inner members, the portion between the central aperture and the O-ring being U-shaped in cross section and adapted to distort when the diaphragm moves.

6. A device in accordance with claim 1 wherein said regulator is of the throwaway non-repairable type and not subject to disassembly to remove foreign matter which might cause leakage past a first outlet valve, thereby rendering the device substantially leakproof into the bowl despite foreign matter which could cause leakage thereto and cause the float to rise to an abnormal level.

7. In a system of the type for adding liquid to pressurized flowing gas, such as oil to air, and having a central source of the liquid at a pressure in excess of the gas for supplying the liquid to at least one remote service device having a bowl, the bowl containing a float for maintaining a substantially constant level of the liquid therein, the device also containing a liquid inlet valve and a pressure regulator, to which the inlet valve is connected, for closing the inlet valve when pressure in the pressure regulator exceeds bowl pressure by a relatively small value and irrespective of the excess pressure of the source, the device further having an outlet valve from the regulator controlled by the float for delivering liquid from the regulator to the bowl, the improvements, comprising;
   said regulator having a circular diaphragm and a pair of telescopic outer and inner members press-fitted together with the diaphragm disposed therebetween, the pair of members being locked together during the press-fitting by deforming means preventing their separation, and a spring engaging the outer member for urging the diaphragm in a direction to open the inlet valve.

8. In a system of the type for adding liquid to pressurized flowing gas, such as oil to air, and having a central source of the liquid at a pressure in excess of the gas for supplying the liquid to at least one remote service device having a bowl, the bowl containing a float for maintaining a substantially constant level of the liquid therein, the device also containing a liquid inlet valve and a pressure regulator, to which the inlet valve is connected, for closing the inlet valve when pressure in the pressure regulator exceeds bowl pressure by a relatively small value and irrespective of the excess pressure of the source, the device further having an outlet valve from the regulator controlled by the float for delivering liquid from the regulator to the bowl, the improvements, comprising;
   said regulator having a circular diaphragm and an outer and inner member secured together with the diaphragm disposed therebetween; and
   an inlet valve seat having a circular outer surface, an elastomeric seal device having a central aperture surrounding said outer surface in static sealing engagement therewith, the seal device having a peripheral O-ring in static sealing engagement between said outer and inner members, the portion between the central aperture and the O-ring being U-shaped in cross section and adapted to distort when the diaphragm moves.

9. Apparatus for supplying liquid comprising:

a bowl for containing liquid and having a float therein for maintaining a constant liquid level;

a source of liquid under pressure;

a first valve for supplying liquid to said bowl from said source, said first valve being of the free floating type, moveable between an open position spaced from an associated first valve seat and a second closed position against the valve seat toward which it is urged by the pressure of said source;

a substantially vertically disposed rod having an upper end upon which the float normally rests and a lower end engageable with said first valve when the float falls to a certain level to move said first valve to said open position, the rod being moveable downwardly upon falling of the float and the float being moveable upwardly out of engagement with the upper end of the rod upon rising of the liquid level;

a backup second valve affixed to said rod at a position spaced from said lower end thereof and downstream from said first valve, said second valve being associated with a second valve seat and being engageable with said second valve seat when the float rises to an abnormal level and maintainable thereagainst by pressure of leakage liquid past said first valve; and a spring urging said second valve toward said second valve seat to initially seat said second valve after which seating is aided by pressure of the leakage liquid.

10. In a system of the type for adding liquid to pressurized flowing gas, such as oil to air, and having a central source of the liquid at a pressure in excess of the gas for supplying liquid to at least one remote service device having a bowl, the bowl containing a float for maintaining a substantially constant level of the liquid therein and further containing an actuator having a lower end and being moveable by the float, the device also containing a liquid inlet valve and a pressure regulator, to which the inlet valve is connected, for closing the inlet valve when pressure in the pressure regulator exceeds bowl pressure by a relatively small value and irrespective of the excess pressure of the source, the device further having a first outlet valve from the regulator unaffixed to the actuator, said first outlet valve being closable by regulator pressure and openable by engagement with the end of the actuator upon falling of the float for delivering liquid from a regulator to the bowl, the improvements, comprising:

a second float controlled outlet valve connected to the actuator at a point spaced from the lower end thereof and downstream from the first outlet valve and completely detached from the first outlet valve to remain open so long as the first outlet valve closes without leakage therepast when the float rises to a normal predetermined level and closable when leakage occurs past the first outlet valve and the float rises to a predetermined level above said normal level whereat the end of the actuator is spaced from said first outlet valve; and a spring normally urging said second outlet valve toward its closed position so that said second outlet valve is initially closed by said spring upon the rising of the float to said predetermined level above said normal level.

* * * * *